Feb. 14, 1950 F. A. LINDLEY 2,497,413

SYNCHRONIZING CIRCUIT

Filed Sept. 13, 1946 4 Sheets-Sheet 1

INVENTOR.
FREDERICK A. LINDLEY
BY
Bohleber, Fassett & Montstream
ATTORNEYS

Feb. 14, 1950 F. A. LINDLEY 2,497,413

SYNCHRONIZING CIRCUIT

Filed Sept. 13, 1946 4 Sheets-Sheet 2

INVENTOR.
FREDERICK A. LINDLEY
BY
Bohleber, Fassett & Montstream
ATTORNEYS

INVENTOR.
FREDERICK A. LINDLEY
BY
Bohleber, Jacatt & Montstream
ATTORNEYS

Feb. 14, 1950 F. A. LINDLEY 2,497,413

SYNCHRONIZING CIRCUIT

Filed Sept. 13, 1946 4 Sheets-Sheet 4

INVENTOR.
FREDERICK A. LINDLEY
BY
Bohleber, Fassett & Montstream
ATTORNEYS

Patented Feb. 14, 1950 2,497,413

UNITED STATES PATENT OFFICE 2,497,413

SYNCHRONIZING CIRCUIT

Frederick A. Lindley, Flushing, N. Y., assignor to Radio-Television Institute, Inc., New York, N. Y., a corporation of New York Application September 13, 1946, Serial No. 696,914

10 Claims. (Cl. 178—69.5)

The invention relates to a circuit and method for securing accurate or precise control of a pair of circuits or means to be triggered, such as oscillators, by a fractional ratio of the low frequency interval. This is accomplished by superimposing a higher frequency wave or signal of the proper frequency upon a control pulse or signal of lower frequency to produce a composite wave which precisely triggers the low frequency oscillator. The circuit of the invention is particularly suited to control the sweep circuits for a cathode ray tube and its particular application is for television sweep circuits. For a television sweep oscillator, it is at least desirable and may be necessary that precise synchronization of the vertical sweep oscillator be maintained and the circuit and method to be described herein does achieve a high degree of precision in the control of the low frequency oscillator for the cathode ray tube in television receivers and transmitters.

An object of the invention is to provide a new and novel circuit and method for precise relative control or timing of a high frequency triggered circuit or means and a low frequency triggered circuit or means in which the ratio of the triggering frequency signals is a fractional value.

It is an object of the invention also to construct a new and novel circuit and provide a method for accurate or precise control of the vertical sweep oscillator relative to the horizontal sweep oscillator for a cathode ray tube and particularly for television circuits.

Another object of the invention is to construct a circuit and provide a method for precisely controlling the vertical sweep oscillator for a cathode ray tube by superimposing a wave derived from the horizontal sweep oscillator onto the low frequency synchronizing signal or pulse which precisely triggers the vertical sweep oscillator, the superimposed signal having a frequency which is a multiple of the frequency of the horizontal sweep oscillator signal.

A still further object of the invention is to construct a circuit and provide a method for precisely controlling the vertical sweep oscillator for a cathode ray tube by superimposing a wave derived from the horizontal sweep oscillator upon the synchronizing wave or pulse for the vertical sweep oscillator and to shape the superimposed wave so that an improvement in the precise timing of the triggering of the vertical sweep oscillator is obtained.

Other objects of the invention will be apparent from the description which follows, when taken in connection with the accompanying drawings illustrating a preferred embodiment of the invention in which.

The circuit and method to be described is particularly advantageous for controlling the vertical sweep oscillator used in connection with the vertical deflection means of the cathode ray tube for a television receiver since it secures precision timing of the oscillator. It is particularly advantageous also, because the exact contour and exact timing or repetition regularity of the vertical sweep circuit synchronizing pulse now becomes less critical than that required in the ordinary synchronizing means or becomes of no particular importance since these factors merely determine the approximate triggering of the vertical sweep oscillator, the precise timing being effected or determined by the superimposed wave. The invention has general application as will be discussed hereinafter.

Figure 1:
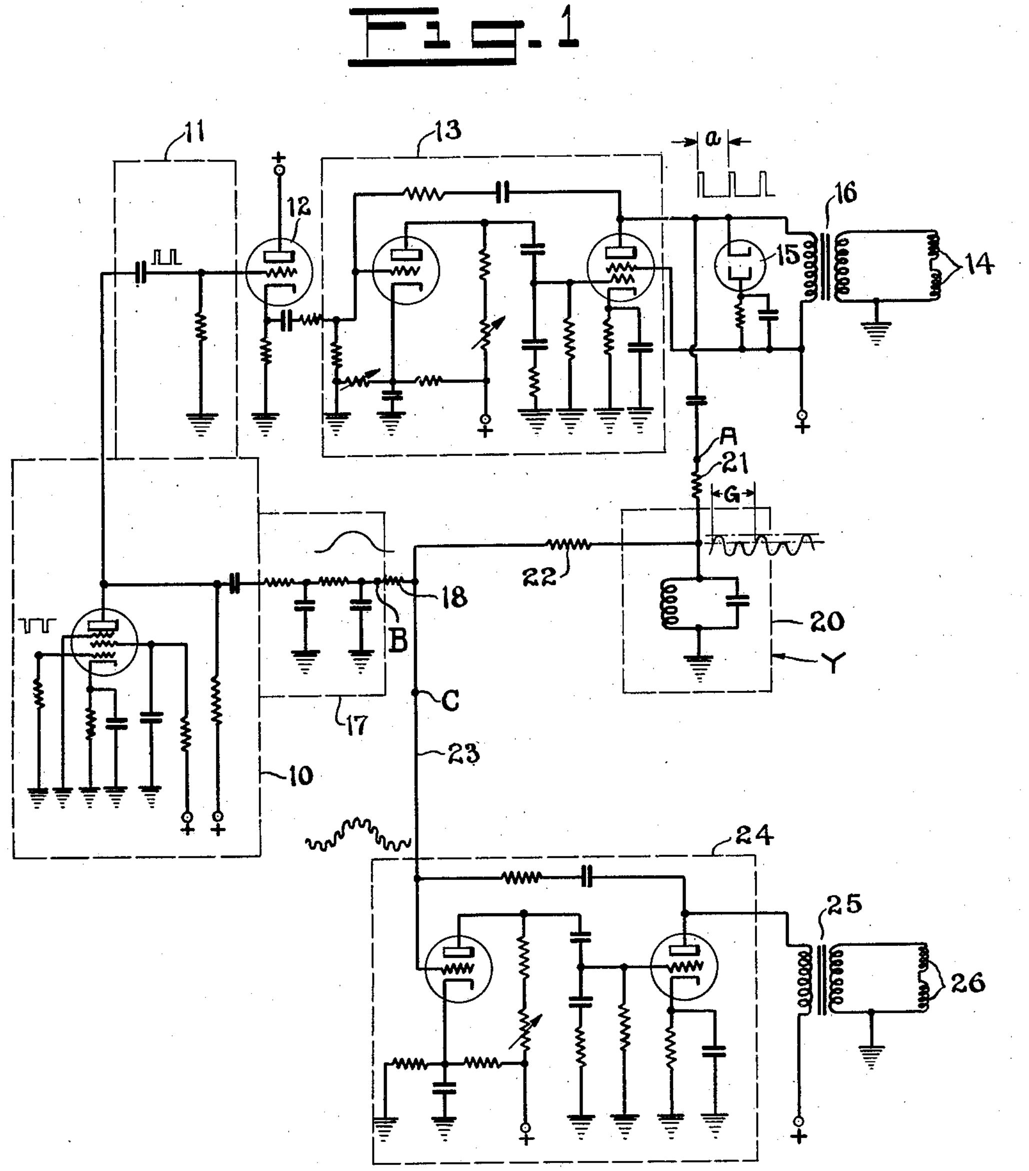
Figure 1 is a circuit diagram of the horizontal and vertical synchronizing pulse or signal separating circuits and the sweep oscillators for a cathode ray tube such as may be used in television circuits.

The circuit of the invention shown in Figure 1 is applied to a television receiver which circuit may be connected with a signal amplifier 10. The circuit includes a differentiating means or horizontal synchronizing pulse separating means 11 which separates the horizontal triggering signal or synchronizing pulse from the received composite signal. The signal separating means may be connected with an amplifier 12. The amplifier is in turn connected with a horizontal or line sweep oscillator 13 so that the latter is triggered by the horizontal synchronizing pulses. The horizontal pulse sweep oscillator constitutes a generator or a source of, what will be termed herein, an intermediate frequency signal or a high frequency triggering signal. The output of the sweep oscillator is connected in any suitable manner to the line sweep elements 14 of a cathode ray tube shown as employing magnetic deflection. The connection shown comprises a damping circuit utilizing a diode 15 and a transformer 16. The frequency generated by the horizontal sweep oscillator is fixed by the number of lines for each frame of the picture and a frequency of 15,750 cycles per second would be used for a television picture of 525 lines.

A vertical synchronizing pulse separating or integrating means 17 is connected also with the signal amplifier 10. This signal separating means constitutes means for generating a low frequency pulse or signal which in customary television practice is 60 cycles per second. The output connection of the integrating or low frequency separating means may include or be connected to an isolating resistor 18.

Means are provided for superimposing a high frequency signal or wave upon the vertical synchronizing pulse or signal. This wave preferably and conveniently is derived from the horizontal sweep oscillator. For interlaced scanning having a two-to-one interlace ratio, a portion of the horizontal sweep oscillator output is fed to a frequency doubler 20 through an isolating resistor 21 which also reduces the signal to the doubler. The frequency doubler constitutes a generator of a high frequency signal which is a multiple of the frequency of the horizontal sweep signal and in synchronism therewith. The output of the frequency doubler would provide a wave having a frequency of 31,500 cycles per second, which is an odd harmonic of the low frequency signal of 60 cycles and twice the fundamental line frequency of 15,750 cycles per second. With the circuit particularly illustrated in Figure 1 the doubled frequency has a wave form which is or approximates a sine wave. This doubled frequency signal or wave may then be superimposed upon the vertical synchronizing pulse by connecting the frequency doubler through an isolating resistor 22 to the output of the vertical synchronizing pulse separating means 17. A wire 23 connects the output of the low frequency separating means and the frequency doubler or their point of connection with a vertical sweep oscillator or generator 24, the triggering of which is, therefore, controlled by the composite wave form, of the 31,500 cycles per second wave superimposed upon the vertical synchronizing pulse. The vertical sweep oscillator is adapted to be connected, such as by a transformer 25 to the vertical sweep deflection elements 26 of the cathode ray tube of the television receiver.

Figure 3:
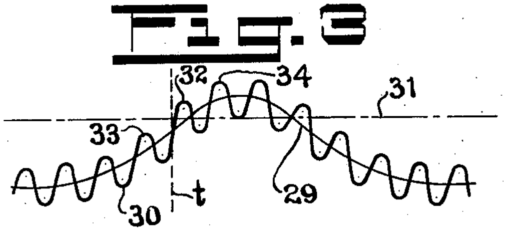
Figures 3 and 4 are illustrative diagrams of a low frequency synchronizing pulse with a high frequency wave superimposed thereon.

The circuit and method described gives precise control of the vertical sweep oscillator or generator for interlace scanning since it will be noted that the doubled frequency provides half line waves or intervals so that the vertical oscillator timing is controlled or exacted at equal half line intervals only which correspond to one half the period of the horizontal scanning frequency. The composite signal is illustrated in Figure 3 in which the vertical synchronization pulse 29 has the doubled horizontal sweep frequency wave 30 superimposed thereon. The triggering level 31 of the vertical sweep oscillator determines the time when the vertical sweep oscillator is triggered by the composite wave or signal formed by the doubled frequency wave 32 superimposed upon the vertical synchronizing pulse. Shifting or adjusting of the triggering level permits selection of a doubled frequency wave 33 or 34 to control the triggering for any half line interval. It is clear that if the contour or slope of the vertical synchronizing pulse is lengthened that additional triggering half line wave will be provided which increases the number of available cycles from which one can be selected for triggering purposes.

Figure 2:
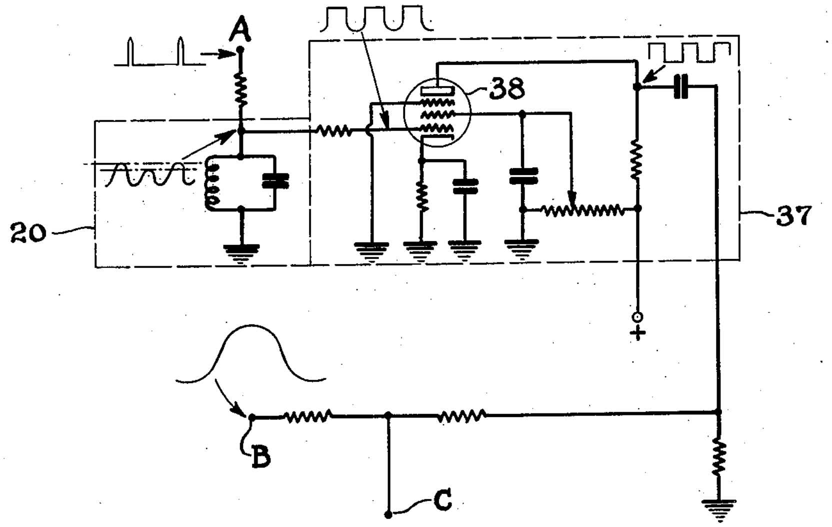
Fig. 2 is a portion of a circuit diagram which may be substituted for a portion of the circuit of Figure 1 for shaping the superimposed higher frequency wave.

If more precise control of the triggering of the vertical sweep oscillator is desired, a wave shaper 37, shown in Figure 2, may be inserted into the circuit between the frequency doubler 20 and the connecting line 23 (Figure 1) to give a wave shape having a steeper front for the doubled frequency waves. In addition the amplitude of alternate waves from the frequency doubler of the circuit of Figure 1 may differ somewhat whereas with the use of a wave shaper the amplitudes of the doubled frequency waves may be made the same. This is due to the limited Q of the frequency doubler timed circuit 20, so that the wave train, at double the frequency of the horizontal sweep oscillator, emanating therefrom will be damped at alternate cycles corresponding to the times when the tuned circuit received no excitation from the oscillator. The circuit of Figure 2 may be substituted for the frequency doubler of Figure 1 with the same connections at points A, B and C.

Figure 4:

In Figure 2 the frequency doubler or multiplier 20 is connected with a wave shaper 37, which is shown as utilizing a discharge tube 38, which is preferably a pentode, the grid of which is connected to the frequency multiplier and transforms the wave into a wave having a steep wave front, a square or substantially square wave being shown. Other wave forms may be developed by the wave shaper which also have sharp wave fronts which likewise give more precise control of the triggering time than the control provided with a sine wave as generated by the frequency doubler. The output of the wave shaper is connected with the output of the vertical sweep pulse separating circuit or integrating means to superimpose the high frequency square wave upon the integrated vertical synchronizing pulse as shown in Figure 4 which is in turn connected with the input of the vertical sweep oscillator.

The synchronizing circuit described provides increased precision in the relative controlled operation of the two triggered means, one operating at a low frequency and the other operating at an intermediate frequency by superimposing a high frequency triggering control signal upon the synchronizing pulse applied to the low frequency triggered means, such that the ratio of the intermediate frequency or the high frequency triggering signal to the low frequency signal is a fraction i. e., the ratio of 15,750 to 60 is 262½. This is accomplished by generating a low frequency signal, an intermediate frequency signal for providing a triggering signal, the ratio of which frequency with respect to the low frequency is a fractional number and a high frequency which is a multiple of the low frequency signal. The high frequency signal is superimposed upon the low frequency signal to give precise control of the low frequency triggered means for fractional frequency ratios with respect to the intermediate or triggering frequency.

The circuit and method described gives a control of the vertical sweep oscillator which is particularly freee from noise or dissymmetrical effects which may vary the contour of the vertical synchronizing pulse because of the much steeper slope and relatively large amplitude of the superimposed wave which triggers the vertical sweep oscillator. The vertical synchronizing pulse merely determines the approximate time that the vertical sweep oscillator is triggered. Considerable variation of the contour or phase relation of the vertical synchronizing pulse, excepting a very large amount of dissymmetry, is swamped out by the steep fronts of the superimposed doubled frequency wave and the relatively much greater amplitude of the superimposed wave. Use of the vertical sweep pulse alone to trigger the vertical sweeep oscillator results in a considerable variation in the triggering time in interlace scanning because the vertical sweep pulse is of elongated or gradual slope, and any variation in the contour or its relative or timed position would change the triggering of the vertical sweep oscillator. The circuit and method herein improves substantially the preciseness of timing in the triggering of the vertical sweep oscillator.

Another advantage is achieved from the circuit and method because the superimposed doubled horizontal line frequency on a vertical synchronizing signal is obtained from the horizontal sweep oscillator and hence, is largely independent in amplitude of the received signal and free from noise. Since the superimposed wave is derived from the horizontal sweep oscillator, it is dependent thereon only as to its frequency. The timing of the vertical sweep oscillator so far as its preciseness or exact point of control is concerned is, therefore, independent of the received signals.

Again no special vertical synchronizing pulses are necessary. Interlaced problems are much reduced therefore, since other methods of obtaining synchronizing information or signals can be more easily used because of the large voltage ratio between the superimposed doubled frequency wave and the normal or usual voltage variations in symmetry which are inherent in successive frame pulses.

With the circuit and method of the invention considerable noise immunity can be obtained by using a tuned circuit resonant to the fundamental component of the horizontal line frequency and a tuned circuit resonant to the vertical frame frequency as the vertical synchronizing separating circuit. Tuned circuits of high Q would give greater noise immunity than the differentiating and integrating circuits now used. However, sweep oscillators synchronized with these synchronizing frequencies would require phasing or framing adjustments. But it is important to note that the precise means of relating the vertical to the horizontal scanning frequencies could give good interlaced scanning.

It is clear that for sequential scanning, the fundamental line frequency of the horizontal sweep oscillator would be used and superimposed upon the vertical synchronizing pulse. Similarly for any other interlace ratio such as three-to-one, or four-to-one, the corresponding harmonic or whole number multiple of line frequency would be used. That is, instead of using a frequency doubler as is used for the two-to-one ratio of interlace scanning, as particularly described, a frequency tripler or a frequency quadrupler would be used for the three-to-one or four-to-one interlace ratio respectively. The relatively high frquency wave which is superimposed upon the vertical synchronizing pulse may be obtained from a separate oscillator and need not be the horizontal sweep oscillator. Such oscillator would generate a frequency which is a multiple of one, two, three, four, etc., of that of the horizontal sweep oscillator depending upon whether there is sequential scanning or interlaced scanning and depending upon the ratio of the interlace scanning.

Figure 5:
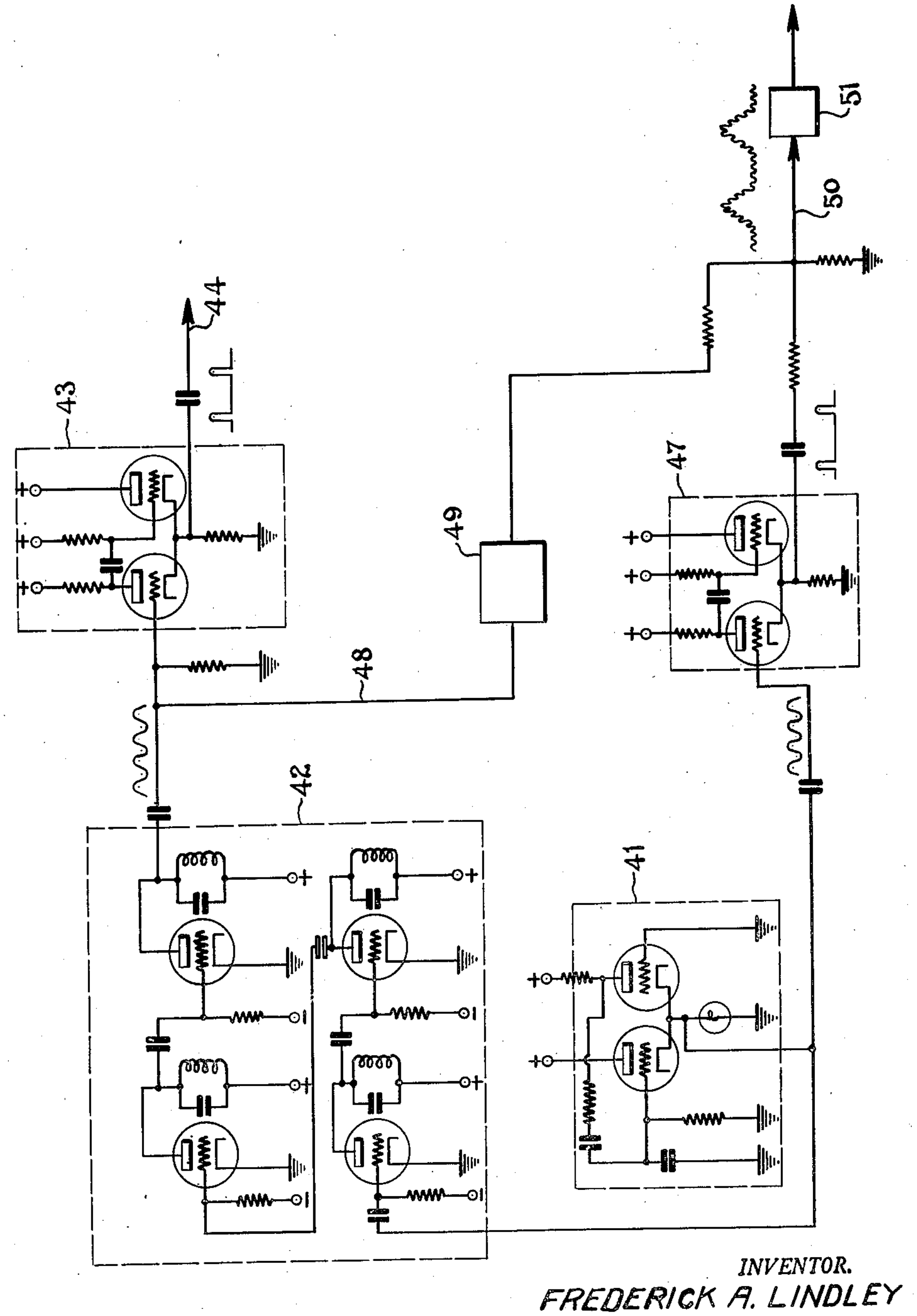
Figure 5 is an illustrative diagram of a triggering circuit utilizing a low frequency oscillator as the basic source of the frequencies generated.

The circuit has general application for triggering any pair of means at fractional frequency ratios as shown in the circuit of Figure 5. A low frequency oscillator 41 of any suitable kind generates a relatively low frequency signal, a 60 cycle per second frequency being merely illustrative. This low frequency wave may be fed to one or more frequency multipliers 42 which generates a high or higher frequency signal, that illustrated being 31,500 cycles per second. The output of the frequency multiplier is connected with a frequency divider 43 that shown being a multivibrator generating an intermediate frequency signal having a frequency of 15,750 cycles per second. The output connection 44 may be connected with any means controlled or triggered by the intermediate frequency signal.

The low frequency oscillator generating the fundamental 60 cycles per second frequency may be connected with wave shaping means 47 if desired, to provide a square or substantially square pulse for the 60 cycle frequency signal. The output of the high frequency generating means is connected by a wire 48 to the output connection of the low frequency generating means or, when a wave shaper is provided as particularly shown, the connection is made to the output of the low frequency wave shaper 47. There may be included in the connection 48 between the high frequency generator and the output of the low frequency generator a wave shaping means 49 of any suitable kind for shaping the high frequency waves to a steep front wave, such as a square wave, for more precise triggering. The high frequency wave is therefore, through the connection, superimposed upon the low frequency signal to produce a composite signal. The junction of the two connections may be connected by a wire 50 to triggered means 51 such as an oscillator which is triggered by the composite signal.

It will be noted that generating means 41 generates a low frequency signal and a high frequency generating means generates a frequency which is derived or initiated from the low frequency oscillator and signal. The output of the high frequency generator is connected with the output of the low frequency generator to provide a composite triggering signal. Means are connected with the high frequency generator to generate an intermediate frequency such that the ratio of the intermediate frequency and low frequency is a fraction. The low frequency triggered means therefore can be precisely controlled at a fractional ratio with respect to the frequency at which the intermediate frequency triggered means is triggered.

Figure 6:
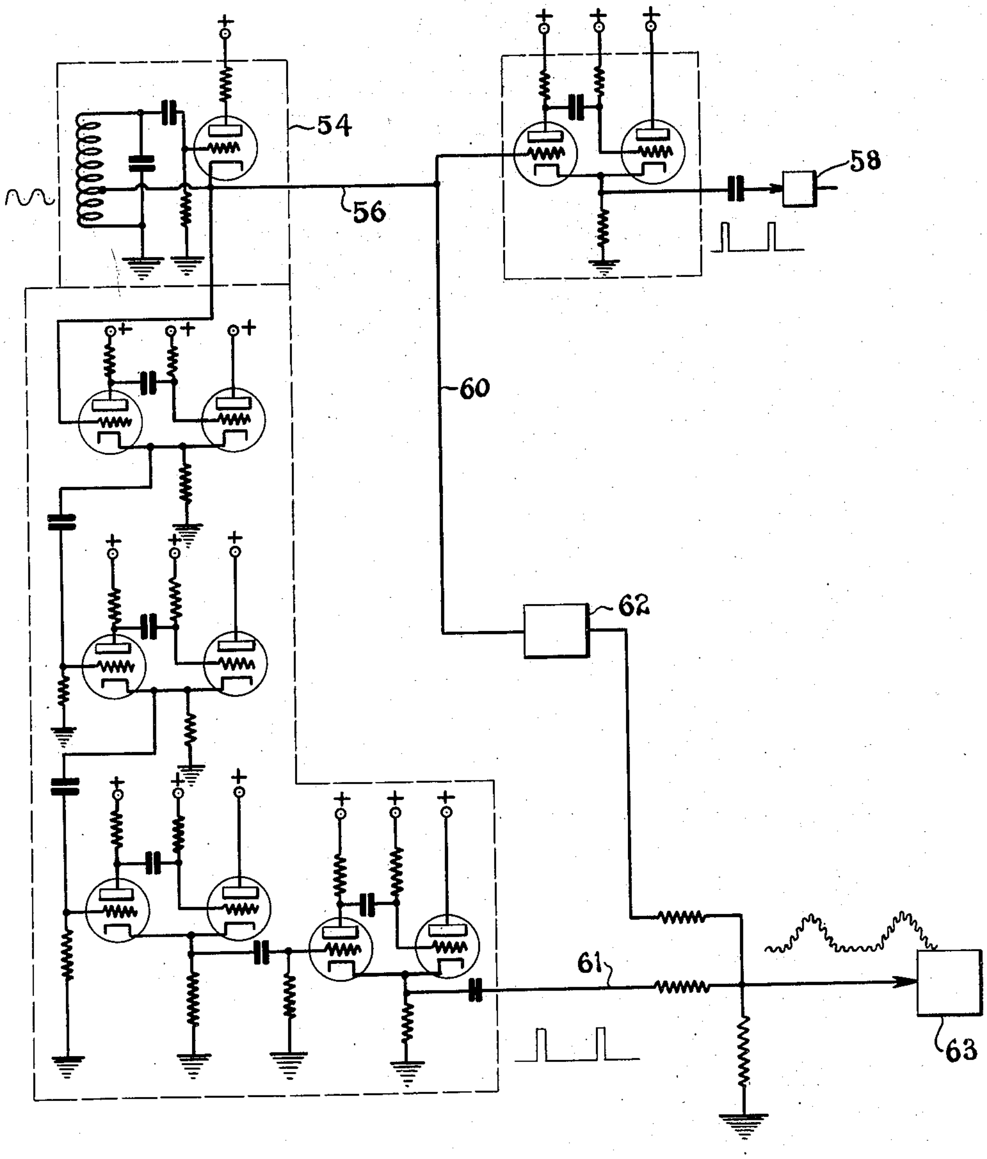
Figure 6 is an illustrative diagram of a triggering circuit utilizing a high frequency oscillator as the basic source of the frequencies generated.

It is not necessary that the source of the fundamental frequency be a low frequency generating means. There is shown in Figure 6 a circuit in which a high frequency generating means 54 is provided which may be any form of oscillator. The output of the high frequency generating means is connected with one or more frequency dividers to generate a low frequency signal. In the construction illustrated there are four multi-vibrators provided to generate a signal having a frequency of 60 cycles per second which is derived from the high frequency signal. The output of the high frequency oscillator is connected by a wire 56 to a frequency divider 57 such a multi-vibrator which constitutes a generating means for generating an intermediate frequency signal which is illustrated as 15,750 cycles per second although it may be any frequency desired. The output of the intermediate frequency generator may be connected with means 58 which is triggered by the intermediate frequency signal.

A wire connection 60 connects the output of the high frequency generating means 54 with the output connection 61 of the low frequency generating means to superimpose the high frequency signal upon the low frequency signal and thereby provide a composite triggering signal. This connection may also include a wave shaper 62 of any suitable kind for shaping the high frequency wave to give it a steep front, whereby very precise triggering may be secured. The composite wave is connected to a low frequency triggered means 63 to precisely control the time of triggering thereof.

Although television frequencies have been used illustratively for the frequencies designated, it is clear that any frequencies may be utilized. In the circuit of Figure 6 the fundamental frequency generated is a high frequency from which a second generating means generates an intermediate frequency signal which is the triggering signal. The circuit also includes a low frequency generating means which generates a low frequency derived from the high frequency. The ratio of the intermediate frequency to the low frequency is a fraction namely 15,750/60 which equals 262½ so that the low frequency triggered means may be triggered at a frequency which is a fractional ratio of the intermediate frequency. Although the frequencies illustrated have a fractional value of two, the ratio may have any desired numerical value merely by properly selecting the frequency ratios.

It will be observed that the low frequency generating means may be an oscillator generating a low fundamental frequency signal as in the circuit of Figure 5, or may be a frequency divider to generate the low frequency signal from a high frequency oscillator as in the circuit of Figure 6, or may be a signal separating means which separates a low frequency signal from a complex signal or signals as in the circuit of Figure 1. Likewise the high frequency generating means may be a frequency multiplier as in the circuit of Figure 5, an oscillator for generating a fundamental high frequency signal as in Figure 6 or a signal separating and integrating means as in the television circuit of Figure 1. The frequency separating means of the television receiver circuit takes the complex signal generated at the transmitter and by the separation at the receiver of the low and intermediate or triggering signals thereby generate the desired signals. The low frequency or frame signal in the complex received signal is separated and generated into useful form as a pulse suitable to be used in the synchronizing circuit. The signal separating means provides the signals which are used for triggering the intermediate frequency triggered means and the low frequency triggered means. The high frequency signal which is superimposed upon the low frequency signal is generated from the intermediate or horizontal sweep oscillator.

This invention is presented to fill a need for improvements in a synchronizing circuit. It is understood that various modifications in structure, as well as changes in mode of operation, assembly, and manner of use, may and often do occur to those skilled in the art, especially after benefiting from the teachings of an invention. Hence, it will be understood that this disclosure is illustrative of preferred means of embodying the invention in useful form by explaining the construction, operation and advantages thereof.

What is claimed is:

1. A synchronizing circuit for control of a cathode ray tube comprising a horizontal synchronizing signal separating means having an output connection, a horizontal sweep generator connected with the horizontal synchronizing separating means, a vertical synchronizing signal separating means producing a low frequency pulse with a sloping edge and having an output connection, means connecting the output connection of the horizontal sweep generator with the output connection of the vertical synchronizing pulse separating means to provide a composite signal of a frequency which is a multiple of one or more of the horizontal sweep frequency superimposed on the vertical synchronizing signal, the extent of the sloping edge being such that at least one high frequency wave peak will be carried thereby, and a vertical sweep generator connected with the connecting means and triggered by the composite signal.

2. A synchronizing circuit for control of a cathode ray tube comprising a horizontal synchronizing signal separating means, vertical synchronizing signal separating means producing a low frequency pulse with a sloping edge and having an output connection, a horizontal sweep generator connected with the horizontal synchronizing means and having an output connection adapted to be connected with the horizontal sweep means of the cathode ray tube, the extent of the sloping edge being such that at least one high frequency wave peak will be carried thereby, means directly connecting the output of the vertical synchronizing signal separating means and the horizontal sweep generator to provide a composite signal from the two signals, and a vertical sweep generator connected with connecting means and triggered by the composite signal.

3. A synchronizing circuit for control of a cathode ray tube comprising a horizontal synchronizing signal separating means, vertical synchronizing signal separating means producing a low frequency pulse with a sloping edge and having an output connection, a horizontal sweep generator connected with the horizontal signal separating means, frequency multiplying means connected with the horizontal sweep generator and having an output connection, the extent of the sloping edge being such that at least one high frequency wave peak will be carried thereby, means connecting the output of the vertical synchronizing signal separating means and the frequency multiplying means to provide a composite signal from the two signals, and a vertical sweep generator connected with the connecting means and triggered by the composite signal.

4. A synchronizing circuit for control of a cathode ray tube comprising a horizontal synchronizing signal separating means, vertical synchronizing signal separating means producing a low frequency pulse with a sloping edge and having an output connection, a horizontal sweep generator connected with the horizontal synchronizing separating means, means including wave shaping means connecting the horizontal sweep generator with the output connection of the vertical synchronizing signal separating means to provide a composite signal of a frequency which is a multiple of one or more of the horizontal sweep frequency, the extent of the sloping edge being such that at least one high frequency wave peak will be carried thereby, and a vertical sweep generator connected with the connecting means and triggered by the composite signal.

5. A synchronizing circuit for control of a cathode ray tube comprising a horizontal synchronizing signal separating means, vertical synchronizing signal separating means producing a low frequency pulse having a sloping edge and having an output connection, a horizontal sweep generator connected with the horizontal synchronizing separating means and having an output connection adapted to be connected with a cathode ray tube, the extent of the sloping edge being such that at least one high frequency wave peak will be carried thereby, wave shaping means connected with the horizontal sweep generator, means connecting the wave shaping means with the output connection of the vertical synchronizing signal separating means to provide a composite signal, and a vertical sweep generator connected with the output connection of the vertical signal separating means and triggered by the composite signal.

6. A synchronizing circuit for control of a cathode ray tube for interlaced television scanning comprising a horizontal synchronizing separating means, a horizontal sweep generator connected with the horizontal synchronizing separating means and having an output connection adapted to be connected with a cathode ray tube, frequency multiplying means connected with horizontal sweep generator for generating a frequency which is a multiple of the sweep frequency, vertical synchronizing signal separating means producing a low frequency pulse having a sloping edge, the extent of the sloping edge being such that at least one high frequency wave peak will be carried thereby, means connecting the frequency multiplying means with the output of the vertical synchronizing signal separating means and providing a composite signal, and a vertical sweep generator connected with the connecting means to be triggered by the composite signal and having an output connection adapted to be connected with a cathode ray tube.

7. A synchronizing circuit for control of a cathode ray tube for interlaced television scanning comprising a horizontal synchronizing signal separating means, a horizontal sweep generator connected with the horizontal synchronizing separating means and having an output connection adapted to be connected with a cathode ray tube, frequency multiplying means connected with horizontal sweep generator for generating a frequency which is a multiple of the sweep frequency, wave shaping means connected with the multiple frequency multiplying means, vertical synchronizing signal separating means having an output connection, means connecting the wave shaping means with the output connection of the vertical synchronizing signal separating means to provide a composite signal, and a vertical sweep generator connected with the connecting means and having an output connection adapted to be connected with the cathode ray tube to control the vertical sweep.

8. A synchronizing circuit for control of a cathode ray tube comprising a horizontal synchronizing signal separating means having an output connection, a horizontal sweep generator connected with the horizontal synchronizing separating means, a vertical synchronizing signal separating means productive of a low frequency pulse with a sloping edge and having an output connection, means connecting the output connection of the horizontal sweep generator with the output connection of the vertical synchronizing pulse separating means to provide a composite signal having a frequency component which is an even multiple of the horizontal generator frequency, the extent of the low frequency pulse sloping edge being such that at least two even multiple frequency component wave peaks will be carried thereby, and a vertical sweep generator connected with the connecting means and triggered by the composite signal.

9. A synchronizing circuit for control of a cathode ray tube comprising a horizontal synchronizing signal separating means having an output connection, a horizontal sweep generator connected with the horizontal synchronizing separating means, a vertical synchronizing signal separating means productive of a low frequency pulse with a sloping edge and having an output connection, means connecting the output connection of the horizontal sweep generator with the output connection of the vertical synchronizing pulse separating means to provide a composite signal having a high frequency component which component is in synchronism with the horizontal sweep generator but harmonically related to the vertical synchronizing signal frequency, the extent of the frequency pulse sloping edge being such that at least two high frequency component wave peaks will be carried thereby, and a vertical sweep generator connected with the connecting means and triggered by the composite signal.

10. A synchronizing circuit for control of a cathode ray tube comprising a horizontal synchronizing signal separating means having an output connection, a horizontal sweep generator connected with the horizontal synchronizing separating means, a vertical synchronizing signal separating means productive of a low frequency pulse with a sloping edge and having an output connection, means connecting the output connection of the horizontal sweep generator with the output connection of the vertical synchronizing pulse separating means to provide a composite synchronizing signal having a control component which is synchronously related to the horizontal sweep generator and having a recurrence frequency which is an odd harmonic of the vertical synchronizing signal recurrence frequency, the extent of the low frequency pulse sloping edge being such that at least two control wave peaks will be carried thereby, and a sweep generator connected with the connecting means and triggered by the composite signal.

FREDERICK A. LINDLEY.

REFERENCES CITED

The following references are of record in the file of this patent:

UNITED STATES PATENTS

| Number | Name | Date |
|---|---|---|
| 2,231,792 | Bingley | Feb. 11, 1941 |
| 2,256,529 | Seeley | Sept. 23, 1941 |
| 2,256,530 | Seeley | Sept. 23, 1941 |
| 2,258,943 | Bedford | Oct. 14, 1941 |
| 2,269,524 | Edwards | Jan. 13, 1942 |
| 2,277,000 | Bingley | Mar. 17, 1942 |
| 2,292,148 | Moe | Aug. 4, 1942 |
| 2,350,536 | Schlesinger | June 6, 1944 |
| 2,398,641 | Homrighous | Apr. 16, 1946 |

Certificate of Correction

Patent No. 2,497,413 February 14, 1950

FREDERICK A. LINDLEY

It is hereby certified that errors appear in the printed specification of the above numbered patent requiring correction as follows:

Column 2, line 46, strike out the word "pulse"; column 4, line 61, for "freee" read *free*; column 5, line 1, for "sweeep" read *sweep*; column 6, line 64, after "such" insert *as*; column 8, line 25, before "means" insert *separating*;

and that the said Letters Patent should be read with these corrections therein that the same may conform to the record of the case in the Patent Office.

Signed and sealed this 23rd day of May, A. D. 1950.

[SEAL]

THOMAS F. MURPHY,
*Assistant Commissioner of Patents.*